June 10, 1969     M. KROFTA     3,449,205
DEVICE FOR AUTOMATICALLY RECORDING AND REGULATING THE DEGREE
OF BEATING OF SUSPENSION OF FIBROUS MATERIAL
Filed May 5, 1965
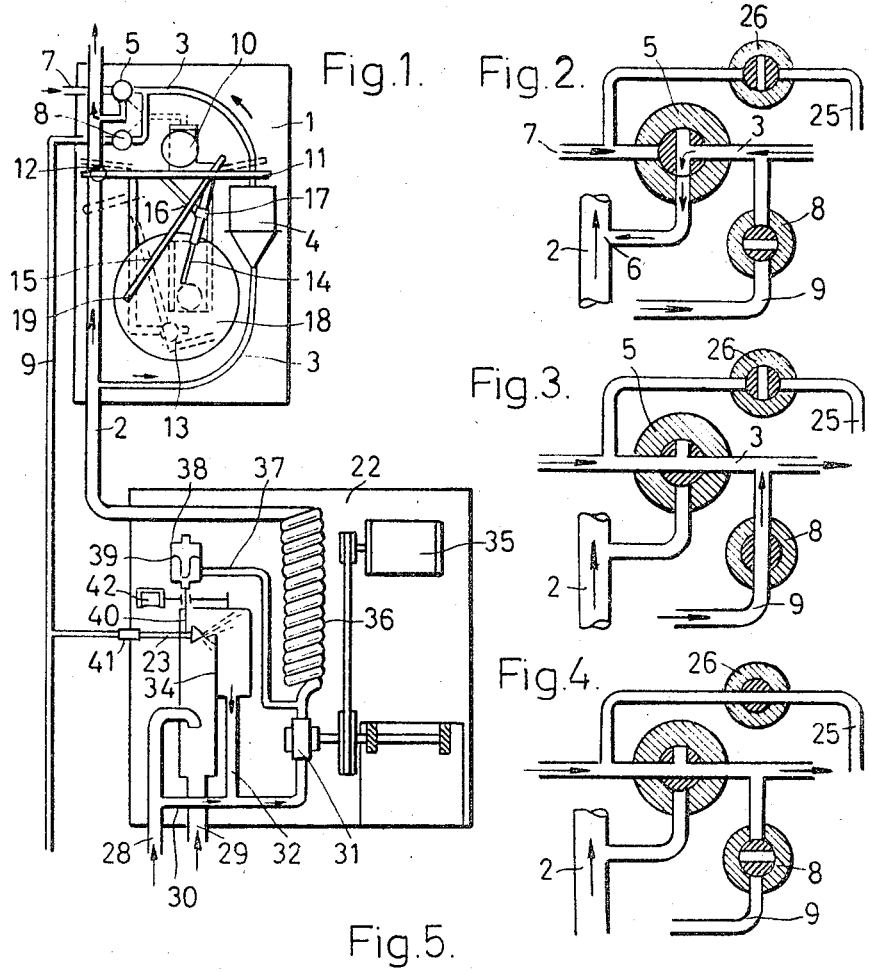
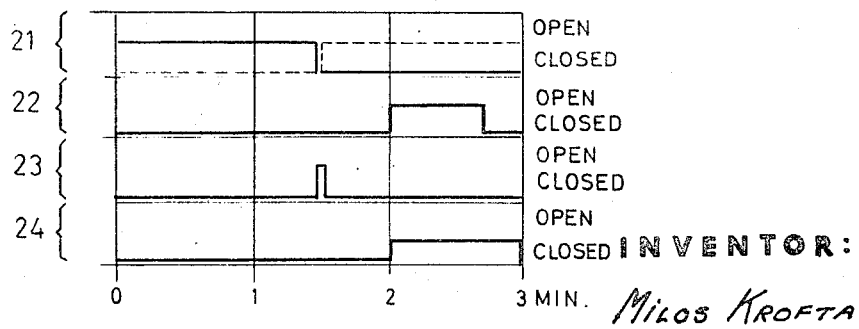
INVENTOR:
MILOS KROFTA
BY Jacob L. Kollins
ATTORNEY United States Patent Office 3,449,205
Patented June 10, 1969

3,449,205
DEVICE FOR AUTOMATICALLY RECORDING AND REGULATING THE DEGREE OF BEATING OF SUSPENSION OF FIBROUS MATERIAL
Milos Krofta, 58 Jokun Ave., Lenox, Mass. 01240
Filed May 5, 1965, Ser. No. 453,271
Int. Cl. D21d 1/00
U.S. Cl. 162—252
8 Claims

ABSTRACT OF THE DISCLOSURE

A device for automatically recording and regulating the degree of beating of suspensions of fibrous material, particularly paper pulp, wherein the weight of water, passing through a screen in a hollow container, is a measure of the degree of beating, comprising a weight balance beam, a shaft for said beam, a hollow measuring container provided with a screen, mounted on one arm of said weight balance beam, a pair of counterweights adjustably mounted on the other end of said weight balance beam, a main conduit for the suspension of fibrous material, a first auxiliary flexible conduit connecting the bottom of the container with said main conduit, a second auxiliary flexible conduit connecting the top of the container with said main conduit, first valve means for selectively connecting said second conduit to said main conduit or to a compressed air source, second valve means for connecting said second conduit to a source of water under pressure, indicating means attached to said beam, setting means for presetting the position of the desired drainage range of the stock and indicating means secured to said beam.

---

The qualities of paper are substantially determined by the refining degree of the paper stock.

An unrefined paper stock is "fast draining" and permits a fast passage of the water at the stage of formation on a screen. A heavily refined stock permits only a small quantity of water to drain at the formation. The drainage characteristics are therefore used to determine the refining degree of the paper stock and through this the paper characteristics.

Continuous measurement of the paper stock drainage rate is known. The basic process is to measure the volume of water flowing through the screen by a continuous dewatering or formation instrument or it is measured discontinuously by measuring the level of filtrate accumulated at each test. Such arrangements in measuring the filtrate by orifices or level control are expensive in fabrication.

In contrast, the invention solves the problem by determining the drainage rate by weighing the filtrate in a given time and employing the results of the measurement for controlling of the refined. In cycles of chosen length a controlling signal is produced which is proportional to the deviation between the present and actual drainage rate of the paper stock.

In the device according to the invention, a hollow container is suspended on an arm of a weighing balance beam the opposite arm of which is loaded with an adjustable counterweight. This hollow container has a perforated screen and is connected by a conduit which is at least partly made of elastic material to a conduit with constant flow of paper stock suspension. Connected to the top side of the hollow container is a second, at least partially flexible conduit through which compressed air or water can be released into the container.

In this drainage rate controller, according to the invention, the position of the weight balance beam indicates the weight of the filtrate in the hollow container.

Should the refining degree of the paper stock be high, a slow draining fiber mat settles on the lower side of the perforated screen and a proportionally small amount of water will pass upward. The small filtrate weight moves the balance beam only moderately. Should the refining degree be low, the paper stock mat is fast draining and will permit proportionally large amount of water to pass upward through the mat. The amount of filtrate will be greater and with it the weight of the water in the hollow container. The movement of the weight balance beam will likewise increase.

An adjusting device such as a three-way valve, provided at the point of the upper outlet of the hollow container serves to provide a repeating cycle of weighing, emptying and washing of the hollow container.

In order to obtain a refiner controlling signal, an adjustable arm is employed with the swinging axis which coincides with the swinging axis on the weight balance beam. This arm which is manually preset to the position of the desired drainage rate of the stock, co-acts with an indicator arm, indicating the weight balance beam position. This indicator arm is provided with a member which cooperates with at least one contact mounted on the manually preset adjustable arm which is set to the position of the desired drainage rate of the paper stock.

In order to provide a continuous recording of the drainage rate, there may be provided a registration device with a paper chart on which the weight of the filtrate in the hollow container is marked at a predetermined time in each measuring cycle. To achieve this purpose the indicating arm has a writing pen and is provided with a device with which a mark on the paper chart is performed at determined intervals. This is obtained by a solenoid operated compressed air valve, through which compressed air is blown in short intervals upon the indicator arm, pressing it against the chart to obtain a mark.

To simplify the control cycle of the individual devices, it is advantageous to provide a time switch which will operate all valves and various control movements at adjustable intervals.

The drainage rate controller, according to the invention, is set for paper stock consistencies from 0.5–2.0%. For higher or irregular stock consistencies it is necessary to connect in series a stock consistency regulator. Its purpose is to bring the stock which is to be measured to the stock consistency of approximately 0.5% as required by the drainage rate controller by addition of dilution water.

The stock consistency regulator is connected in series to the drainage rate controller in the further development of the invention and it has a dosing pump which pumps a constant amount of paper stock which is received from a conductor of paper stock of unregulated or high consistency, into a device in which a wall friction is produced, said friction resulting in a certain pressure behind the dosing pump. The device for producing friction is constructed as a tubular spiral. The outlet is connected with the drainage rate controller. At the entrance to the wall friction device and thus directly behind the dosing pump a conduit is branched off, leading into a closed control device provided with a pressure membrane and piston.

The pressure membrane is balanced off by an adjustable counterweight or similar auxiliary force. When the friction pressure in the spiral is equal to the counterweight, the membrane does not move. When the friction pressure in the spiral is too small, the counterweight pulls the membrane downward. The friction pressure depends on the paper stock consistency. With increasing stock consistency the friction pressure will increase. Contrarywise, the pressure will decrease with lower paper stock consistency. An adjustable flexible member is secured on the pressure membrane of the control member and controls the flow, for example the position of a spray, of the dilution water. Depending on the position of the water spray, various amount of dilution water—according to the position of the pressure membrane—flow to the suction side of the dosing pump. Should the pressure in the tubular spiral be relatively high, due to the high stock consistency e.g. 4%, then the pressure membrane will pull the flexible setting element which regulates the flow of the dilution water to such position, so that more dilution water will reach the suction side of the dosing pump and the stock consistency flowing into the dosing pump will decrease. With the decrease achieved thereby, the friction resistance in the tubular spiral will be lower and with this the pressure after the dosing pump. At the same time the pressure membrane in the control member will be lowered, the flexible setting element will also move down and the quota of the dilution water flowing to the suction side of the dosing pump will be lowered.

Since a time interval is required until the stock and water mixture will flow through the tubular spiral, it is advantageous to hold firm in adequate intervals the pressure membrane itself and thereby the adjusting element controlling the outflow of dilution water with suitable devices, for example a solenoid with counter springs. Such a solenoid is demagnetized at certain intervals for a short time by means of a control device and during this time the outlet of the dilution water is kept in the momentary fixed position. During the control interval a pressure change provides another position for the outflow of the dilution water.

Further details of the invention will become apparent from the details illustrated in the drawing:

FIG. 1 is a drainage rate controller with a pre-adjusted stock consistency regulator.

FIGS. 2, 3 and 4 show various positions of the three-way valve of the drainage rate controller.

FIG. 5 is a schematic control diagram for the various valves of the drainage rate controller.

The drainage rate controller has a housing 1, through which passes a main conduit tube in which the stock constantly enters in the direction of the arrow from below, and flows out above. An auxiliary tubular conduit 3, branches off from the main conduit. A hollow container of certain volume is mounted in the auxiliary conduit, said container being provided with a screen at its bottom (not shown). The upper end of the auxiliary conduit 3 opens through a three-way valve 5 into the main conduit 2 at 6. The three-way valve is provided with a closure at 7. Compressed air may enter the conduit 3.

On the side adjacent the conduit 3 a further valve is provided through which water under pressure may reach from the conduit 9. A timer 10 operates the solenoid valves 5 and 8. The hollow measuring container 4, made of transparent material, such as plexiglass is suspended on the balance beam 11, which on its other end is balanced by a pair of adjustable counterweights 12 and 13. The measuring range may be varied by adjusting and/or removing the weights 13. The adjustable arm 14 serves to adjust by hand the desired degree of the drainage rate. Said adjusting arm has the swinging point on the axle of the balance beam 11. The arm 15 which indicates the actual value of the drainage rate is rigidly secured to the weight balance and swings with it. Said indicator arm carries a member 16 which cooperates with the contacts 17 at the presetting arm 14. Such contacts actuate a servomotor (not shown) moving the plug of the refining machine to change the refining degree and the drainage rate. A paper chart 18 serves for the purpose of recording the drainage rate. A writing point is secured on the end of the indicator arm 15 and records in intervals only. For this purpose the indicating arm is mounted in such a way as to swing over the chart. The marking of the pen on the chart is effected by air pressure blowing through the conduit 7, as soon as the valve 26 is opened. In FIG. 1 both parts are omitted for the sake of simplicity. The regulating cycle of the drainage rate controller takes place according to the setting of the timer 10 which is shown with a cycle of 3 min. in FIG. 5. In this figure the region 21 illustrates the switching cycle for the servomotor operating the refining machine. The servomotor operates in one direction (decrease of refining) when the indicating arm 15 does not reach the presetting arm at the time when the pen marks. When on the other hand the indicating arm 15 overrides the presetting arm before it has marked, the servomotor operates in opposite direction to increase the refining of the stock. Should the indicator arm mark at the moment when it is over the presetting arm, the servomotor will not operate. The extent of operation of the servomotor is thus proportional to the deviation of the actual drainage rate from the preset value. The area 22 indicates the working cycle of the valve 8, the area 23 indicates the working cycle of the valve 26 for the marking of the pen 19 on the indicating arm 15 and the area 24 the regulation of the compressed air supply at the three-way valve 5.

The drainage rate controller operates as follows:

As seen in the illustration for the region 24 in FIG. 5, the three-way valve 5 closes the compressed air conduit 7 for two minutes (FIG. 2). During this period the paper stock flows from the conduit 2 to the conduit 3, from below into the hollow container 4 and forms a fiber mat on the bottom of the screen. Water passes upwardly through the fiber mat and the screen, the weight of said water actuating the tilt of the balance beam 11 and of the indicator arm 15, thus indicating the weight of water drained through the fiber mat. This value is marked as a drainage rate as a point on the chart, when after the preset time the valve 26 opens briefly and compressed air blows on the pen 19 marking a mark area 23 in FIG. 5. After the passage of two minutes the three-way valve 5 is changed to the position shown in FIG. 3 or FIG. 4. Compressed air enters from 7 into the conduit 3, empties the hollow container 4 and blows the stock deposited under the screen back into the conduit 2. The valve 10 is simultaneously brought from the closed position shown in FIG. 2 into the open position shown in FIG. 3. The water entering under pressure completely cleans the screen in the hollow container 4. As shown in FIG. 5 region 23, 22, the valve 8 closes again after about ¾ of a minute, thus resulting in the condition illustrated in FIG. 4, which condition changes again after the passage of 1 min. into the condition shown in FIG. 2. There are thus available each time two minutes for measuring the draining rate.

The drainage rate controller is set for stock consistencies of 0.5–2.0%. For higher stock consistencies a stock consistency regulator 27 must be connected in series, as shown in FIG. 1 in the bottom part thereof, the purpose of which is to assure that the stock is diluted to a consistency of 0.5–2.0% as required for the drainage rate controller. Paper stock of unregulated consistency or of a consistency greater than 2% enters through the conduit 28 and overflows into the outlet 29. A dosing pump 31 delivering a constant volume takes the stock from the conduit 28. Dilution water is added to the suction of the dosing pump through conduit 32. This water comes from a spray nozzle 23, branches off from the pressure water conduit 9, and which provides, depending on its height, varying amounts of dilution water, flowing over the dividing wall 34 in the outlet 29 or in the conduit 30. The dosing pump 31, which is driven by a motor 35 through a V-belt, pumps into the friction spiral 36 which is connected to the main conduit 2 of the drainage rate controller. The pressure existing in the tubular spiral 36 as a result of a wall friction and which is proportional to the stock consistency activates through the conduit 37 a control member 38. This control member is composed of a membrane 39 and a control rod 40, to which the spray nozzle 33 and an adjustable counterweight 41 are secured.

Should the stock consistency be high and thus the pressure behind the dosing pump 31 proportionally increased, then the membrane 39 and the control rod 40 therewith will be lifted with the spray nozzle and the counterweight 41 against the dividing wall 34. As a result, more dilution water will reach the conduit 32. The paper stock in the conduit 30 will be diluted and will automatically effect the regulation of the stock consistency until the preset consistency, adequate for the drainage rate controller, will be reached. A solenoid with spring 42 holds firm the control rod 40 in predetermined periods required for the full passage of the stock through the spiral in order to prevent overregulation. This solenoid-spring holder is advantageously operated by the timer 10 in prescribed intervals.

The drainage rate controller and the consistency regulator according to this invention can be built in one housing or in separate housings installed at a distance from one another.

What I claim is:

1. A device for automatically recording and regulating the degree of beating of suspensions of fibrous material, particularly paper pulp, wherein the weight of water, passing through a screen in a hollow container during a predetermined time period, is a measure of the degree of beating, comprising a weight balance beam, a shaft for said beam, a hollow measuring container provided with a screen, mounted on one arm of said weight balance beam, a pair of counterweights adjustably mounted on the other end of said weight balance beam, a main conduit for the suspension of fibrous material having a constant hydraulic head, a first auxiliary flexible conduit connecting the bottom of the container with said main conduit, a three-way compressed air valve, a second auxiliary flexible conduit connecting the top of the container with said three-way compressed air valve, first valve means for selectively connecting said second conduit to a compressed air source, second valve means for connecting said second conduit to a source of water under pressure, indicating means attached to said beam, setting means for presetting the position of the desired drainage range of the stock, said setting means comprising an adjustable setting arm which is swingable on the axle of the balance beam, and the indicating means comprising an indicator arm for indicating the position of the balance beam, said indicating arm being provided with a first contact element, the adjustable arm having a second contact element, closure of the contact elements operating the servomotor of the refining machine.

2. Device according to claim 1, in which the indicating arm is provided with a writing point and compressed air means to operate the writing point for marking.

3. Device according to claim 2, further provided with means for carrying a diagram disc in the area of the adjustable arm and of the indicator arm.

4. Device according to claim 3, further provided with a time switch for switching in valve controls and control devices at adjustable intervals.

5. Device according to claim 4, wherein a consistency regulator is connected in series with the main pipe line.

6. Device according to claim 5, wherein the consistency regulator comprises a pump for forwarding unregulated paper stock, a wall friction device consisting of a tubular spiral having an outlet connected to the main conduit upstream of the branch pipe, the wall friction device also having an inlet connected to the second conduit provided with a pressure membrane and to said pump, said membrane being provided with an adjustable element, a spray nozzle operably connected to said adjustable element for controlling the addition of the dilution water.

7. Device of claim 6, wherein the adjustable member for positioning the dilution water addition is provided with a holding means.

8. Device according to claim 7, wherein the holding means comprises a spring compensated solenoid releasable at predetermined intervals.

References Cited

UNITED STATES PATENTS 3,086,905   4/1963   Richardson _____ 162—263 X

FOREIGN PATENTS 489,779   8/1938   Great Britain.

HOWARD R. CAINE, *Primary Examiner.*

U.S. Cl. X.R.

117—26, 139; 152—353; 350—105